July 1, 1941. J. R. THOMPSON Re. 21,851

PROTECTIVE COVERING FOR GONDOLA CARS

Original Filed May 2, 1938 2 Sheets-Sheet 1

Inventor:
JAMES R. THOMPSON.
By: John E. Jackson
his Attorney.

July 1, 1941. J. R. THOMPSON Re. 21,851

PROTECTIVE COVERING FOR GONDOLA CARS

Original Filed May 2, 1938 2 Sheets-Sheet 2

Inventor:
JAMES R. THOMPSON.
by: John E. Jackson
his Attorney.

Reissued July 1, 1941

Re. 21,851

UNITED STATES PATENT OFFICE 21,851

PROTECTIVE COVERING FOR GONDOLA CARS

James R. Thompson, Cleveland, Ohio, assignor to The American Steel and Wire Company of New Jersey, a corporation of New Jersey Original No. 2,218,441, dated October 15, 1940, Serial No. 205,658, May 2, 1938. Application for reissue November 20, 1940, Serial No. 366,483

4 Claims. (Cl. 105—377)

The present invention relates to a protective covering for articles of manufacture during shipment in gondola cars and the method of attaching the covering to the car.

An object of this invention is to provide a novel means of securing a water-proof protective covering to a gondola car in order to protect the steel bars, rods, coils and strip material during transit.

Other objects and advantages will become apparent as the description proceeds in which.

Figure 1:
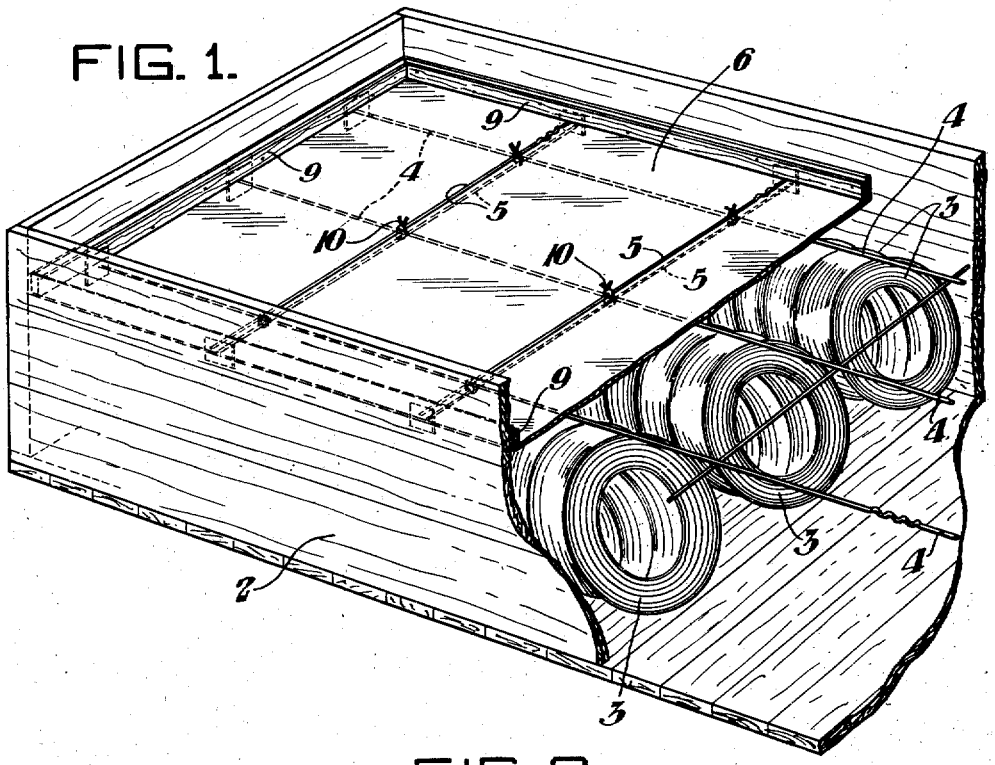
Figure 1 is a detailed perspective of a gondola car having coils of wire and showing the protective covering of the present invention.

In the drawings, the numeral 2 represents a conventional type of gondola car having side and end walls within which has been positioned, in this particular illustration, a plurality of loosely piled coils of wire or bundles of rods 3 ready for shipment.

Figure 3:
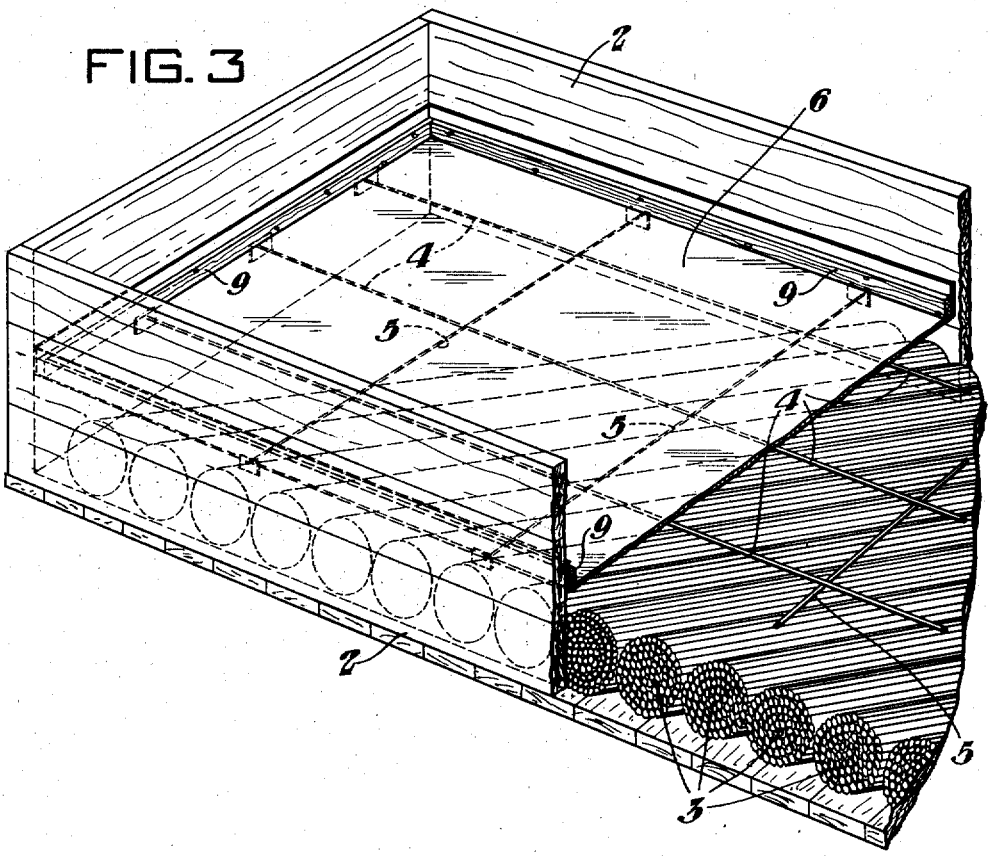
Figure 3 is a view similar to Figure 1, but disclosing the manner of laying bundles of rods in place of the coils of wire.
Figure 4:
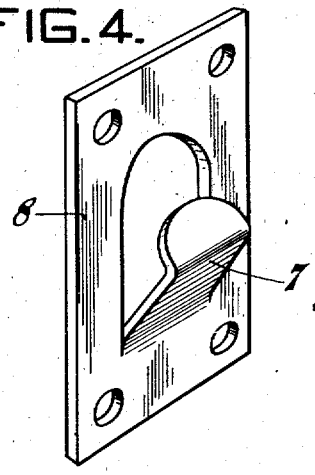
Figure 4 is a detailed perspective of the fastening clip for the cross-wires.
Figure 5:
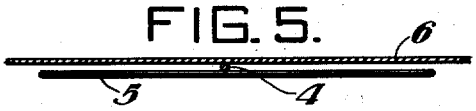
Figure 5 is a detailed section showing the wires beneath the covering.

Under the present practice of shipping coils of wire, bundles of rods or stacks of sheet material, such coils and the like are individually wrapped by heavy water-proof paper, and the individually wrapped coils and/or bundles, as the case may be, are braced in the gondola car by timber bracing nailed securely to the car. However, such an expensive proposition is eliminated under the present invention in that the coils, bundles or stacks of sheet material need not be individually wrapped but are merely piled up loosely, as shown in Figure 1, or, if bundles of rods, as is shown in Figure 3, may be laid diagonally in the car.

In either case, after the articles have been positioned within the car ready for shipment, suitable steel wires 4 are secured the length of the car from one end to the other, while cross-wires 5 are stretched beneath the longitudinally extending wires 4 and are securely fastened to the outwardly extending hook-like tongue 7 formed on the fastening clip or bracket 8 which is secured to the walls of the car construction.

Figure 6:
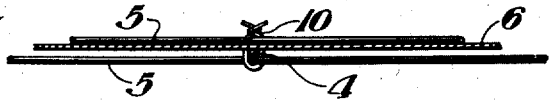
Figure 6 is a detailed section of the manner of securing the protective covering and the cross-wires together.

The water-proof protective covering 6 is secured to the side and end walls of the car by means of nailing strips 9 to thus make the edges of the covering water-tight. If desired, the cross-wires 5 may be of sufficient length to extend back across the car and over the one-piece water-proof protective covering 6 with the free end securely fastened to the outstanding tongue 7 formed on the fastening clip 8. Under such a construction, the protective covering may be fastened down to the longitudinally extending wires 4 and the cross-wires 5 under the protective covering by means of the tie-wires 10, as shown in Figure 6, and thereby prevent the wind from dislodging the protective covering from its fastenings and from blowing it out of the car. Also, a perforated plate may be used in connection with the tie-wires 10 at the intersections to prevent the tie-wires from tearing the paper through which it will be inserted.

Figure 2:
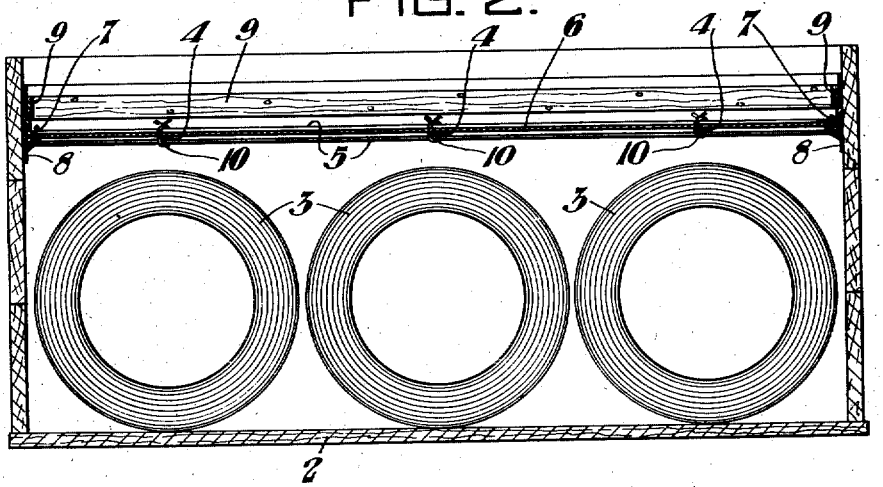
Figure 2 is a transverse section through the showing of Figure 1.

After the stock has been positioned on the gondola car, the steel wires 4 are stretched from end-to-end in order to provide means for forming a base or support in combination with the cross-wires 5 for the protective covering. The cross-wires 5 have one end secured to the side of the car or the clip, and are stretched in any conventional manner to the opposite side of the car and around the tongue 7, up through the protective covering 6 and back across the car on the outside of said covering, and secured at the opposite side to the body of the car or the clip, as shown in Figure 2. The water-proof paper or fabric covering will be uncoiled from its roll and fastened between the cross-wires 5 progressively from one end of the car to the other.

While I have shown and described specific embodiments of the present invention, it will be understood that I do not wish to be limited exactly thereto, since various modifications may be made thereto without departing from the scope of the appended claims.

I claim:

1. In a gondola type of car within which articles of manufacture have been positioned for shipment, means for protecting the articles of manufacture during transit, including in combination, a plurality of spaced apart longitudinally and transversely disposed wires extending throughout the length and width of the car above said articles therein with the transverse wires disposed in under the longitudinal wires so as to aid in supporting the same, means arranged on the side and end walls of said car to which the said wires are attached, a water-proof protective cover extending over the entire area of said car and supported by said wires, each of said transverse wires consisting of a double wire with the protective cover interposed therebetween, nailing strips positioned along the free edges of said protective covering around the car and secured to the walls thereof for maintaining the edges of said cover water-tight, and tie wires for fastening the covering and both the longitudinal and transverse wires together at least at some of the points of intersection thereof intermediate the car walls for maintaining the cover in position on the wires at all times.

2. In a gondola type of car within which articles of manufacture have been positioned for shipment, means for protecting the articles of manufacture during transit, including in combination, a plurality of spaced apart longitudinally and transversely disposed wires extending throughout the length and width of the car above said articles therein with the transverse wires disposed in under the longitudinal wires so as to aid in supporting the same, a plurality of brackets secured to the end and side walls of said car having an outwardly extending hook-like tongue portion arranged therewith, said wires being securely fastened to the tongue of said clips, a water-proof protective covering extending over the entire area of said car and supported by said wires, each of said transverse wires consisting of a double wire with the protective cover interposed therebetween, nailing strips positioned along the free edges of the protective covering around the car and secured to the walls thereof beyond said clips for maintaining the edges of said covering water-tight, and a tie wire extending through the protective covering and around both the longitudinal and transverse wires at least at some of the points of intersection thereof intermediate the car walls for binding the same together and to maintain the protective covering in position on the wires at all times.

3. In a gondola type of car within which articles of manufacture have been positioned for shipment, means for protecting the articles of manufacture during transit, including in combination, a plurality of spaced apart longitudinally and transversely disposed wires extending throughout the length and width of the car above said articles therein with the transverse wires disposed in under the longitudinal wires so as to aid in supporting the same, means arranged on the side and end walls of said car to which the said wires are attached, a water-proof protective cover extending over the entire area of said car and supported by said wires, with at least some of said transverse wires consisting of a double wire with the protective cover interposed therebetween, and means arranged along the edges of said protective covering around the car and secured to the walls thereof for maintaining the edges of said cover watertight.

4. In a gondola type of car within which articles of manufacture have been positioned for shipment, means for protecting the articles of manufacture during transit, including in combination, a plurality of spaced apart longitudinally and transversely disposed wires extending throughout the length and width of the car above said articles therein with the transverse wires disposed in under the longitudinal wires so as to aid in supporting the same, means arranged on the side and end walls of said car to which the said wires are attached, a water-proof protective cover extending over the entire area of said car and supported by said wires, with at least some of said transverse wires consisting of a double wire with the protective cover interposed therebetween, means arranged along the edges of said protective covering around the car and secured to the walls thereof for maintaining the edges of said cover water-tight, and tie wires extending through said cover fastening the same to some of said wires at various points intermediate the car walls for maintaining the cover in position on the wires at all times.

J. R. THOMPSON.